Oct. 3, 1944.  W. L. McNAMARA  2,359,432
TRANSFERRING DEVICE
Filed Dec. 7, 1940  7 Sheets-Sheet 1
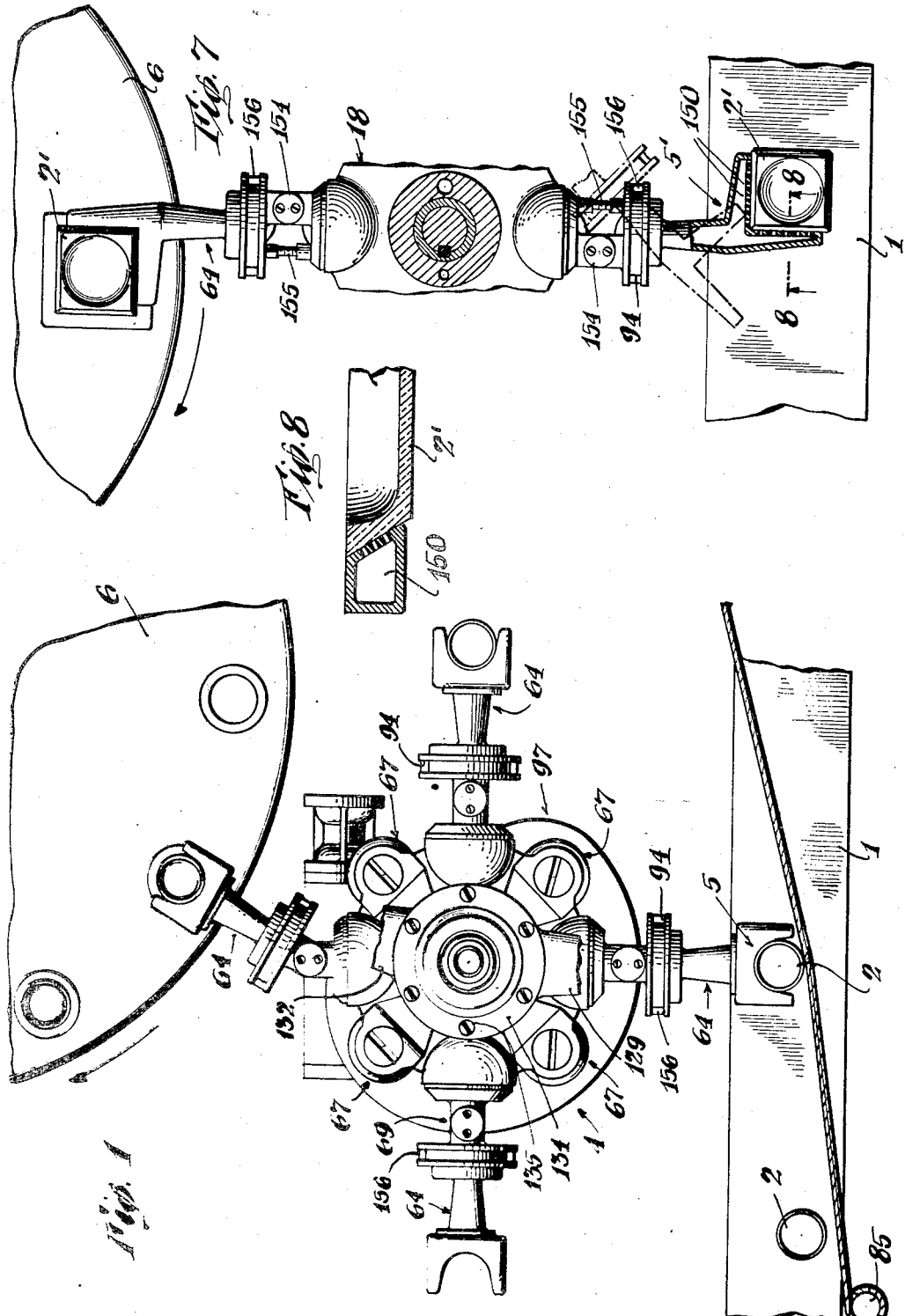
INVENTOR
William L. McNamara
BY
Norman T. Holland
ATTORNEY

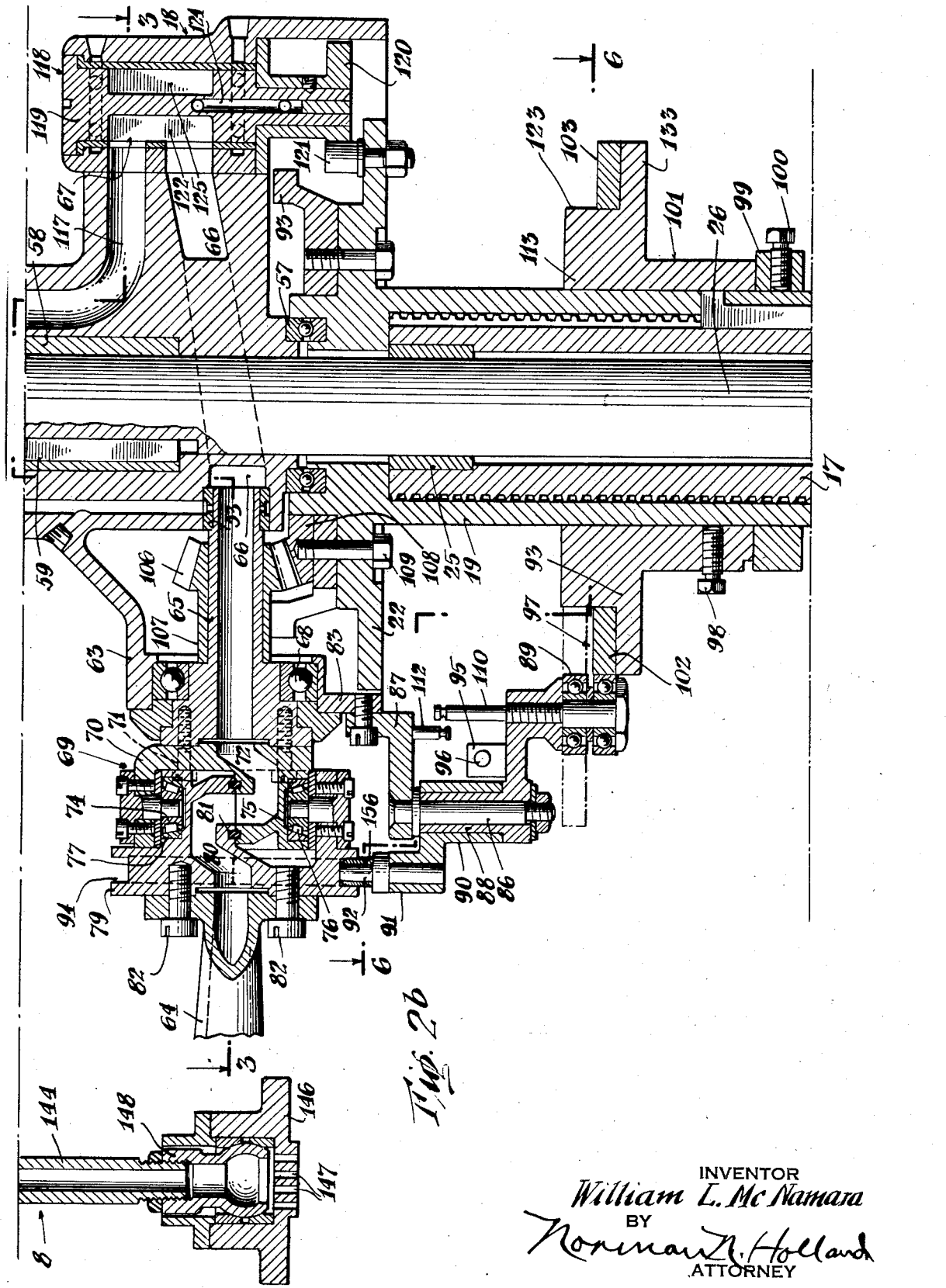

Oct. 3, 1944.   W. L. McNAMARA   2,359,432
TRANSFERRING DEVICE
Filed Dec. 7, 1940   7 Sheets-Sheet 4
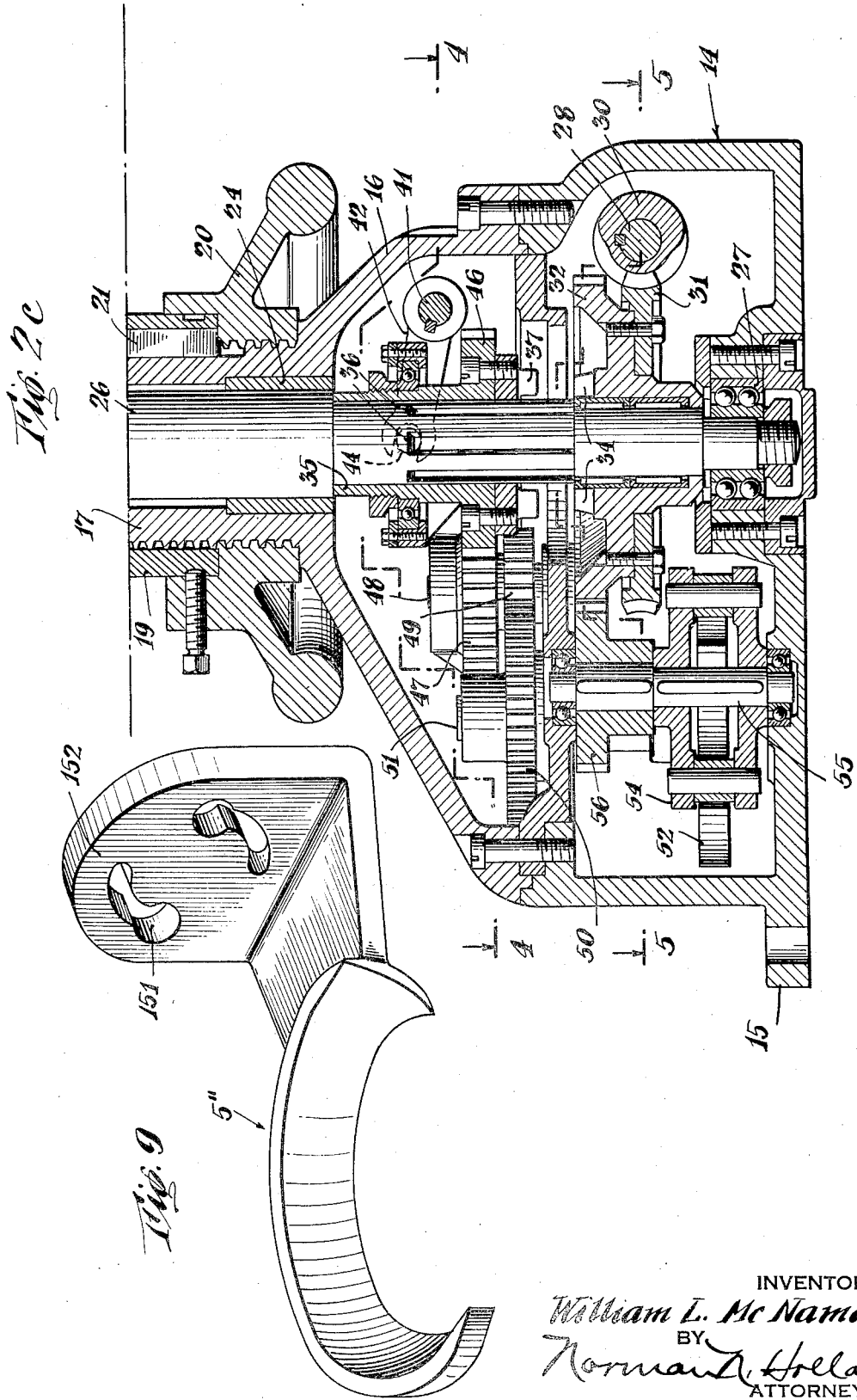
INVENTOR
William L. McNamara
BY
Norman D. Holland
ATTORNEY

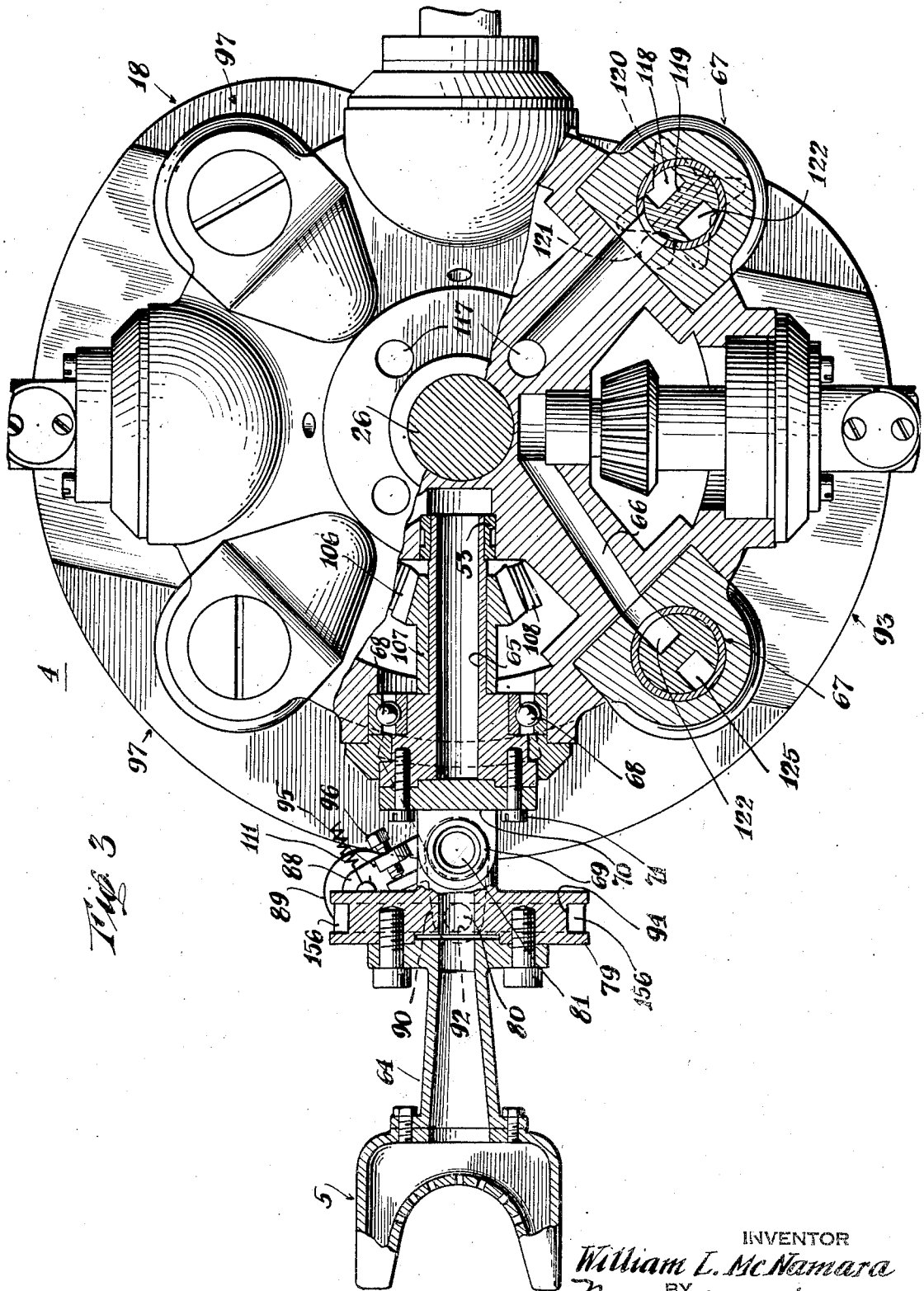

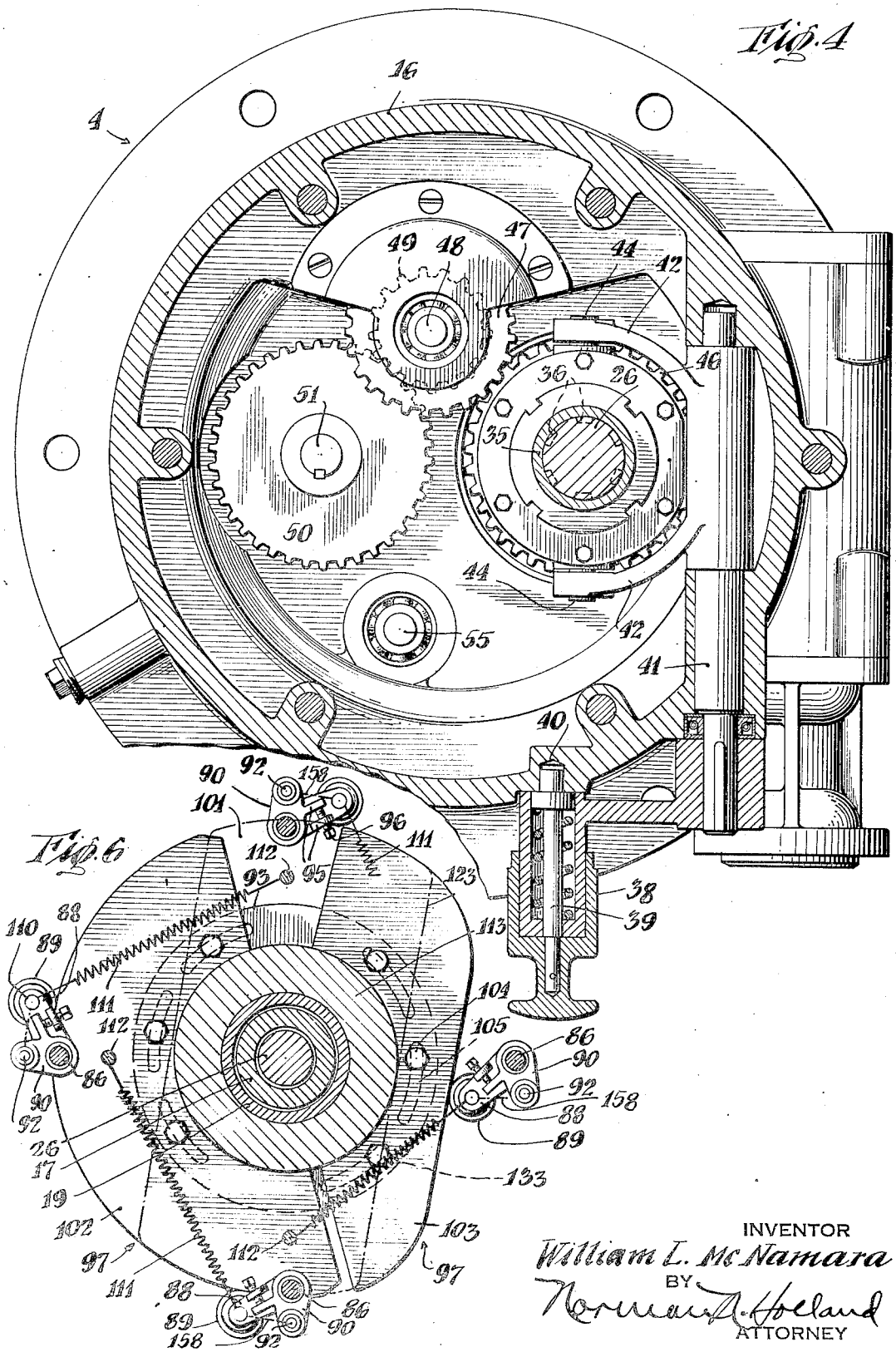

Oct. 3, 1944.  W. L. McNAMARA  2,359,432
TRANSFERRING DEVICE
Filed Dec. 7, 1940  7 Sheets-Sheet 7

INVENTOR
William L. McNamara
BY
Norman N. Holland
ATTORNEY

Patented Oct. 3, 1944

2,359,432

UNITED STATES PATENT OFFICE 2,359,432

TRANSFERRING DEVICE

William L. McNamara, Lancaster, Ohio, assignor to Anchor Hocking Glass Corporation, Lancaster, Ohio, a corporation of Delaware Application December 7, 1940, Serial No. 368,977

24 Claims. (Cl. 214—1)

The present invention relates to transferring devices and more particularly to devices for transferring glassware and the like.

A number of devices have been devised for transferring various types of articles, including glassware, and patents have been granted therefor. The present invention provides a comparatively simple device which performs its work effectively and which is adapted to be applicable to a much larger variety of ware than existing devices and is also adapted for a greater variety of service requirements. For example, in the glass industry a forming machine may be operating one day to produce tumblers which may be delivered to ordinary conveyor belts leading to annealing leers. The next order may be for fancy drinking glasses which have to be fire finished or which may have to be cracked off and fire finished. In such instances the size and shape of the ware and the types of machinery for forming and transferring the ware may differ widely. The speed of the glass forming machine and the speed of the finishing machine may differ. Their heights from the floor may vary. The molds from which the ware is removed and the holders to which the ware is delivered may be quite different.

The present invention aims to provide a simple transfer device which may be quickly changed to work with various types of machines and to handle the various types of ware molded thereby. The invention also aims to provide a transfer device which is effective under the various operating conditions and with the various types of ware encountered.

An object of the present invention is to provide an improved machine for handling glassware and other articles.

Another object of the invention is to provide an improved transfer device applicable to various types of glassware and to the various types of machinery used in the manufacture thereof.

Another object of the invention is to provide an improved means for controlling the movement of the ware engaging device at the time of engagement and release of the ware.

Another object of the invention is to provide improved devices for transferring ware utilizing suction holding means.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a top plan view, partly schematic, with the vertical lifting devices broken away illustrating the transfer device removing ware from a conveyor and placing it on a finishing machine;

Figs. 2a, 2b and 2c are vertical sectional views of the machine illustrating the various parts, the sections being shown on three sheets in order to have the parts sufficiently large for illustrative purposes;

Fig. 3 is a sectional view along the line 3—3 of Fig. 2b;

Fig. 4 is a sectional view along the line 4—4 of Fig. 2c;

Fig. 6 is a sectional view along the line 6—6 of Fig. 2b illustrating the operation of the cam for controlling the movement of the vessel engaging means;

Fig. 7 is a top plan view of a modification illustrating the invention applied to the removal of ashtrays from a molding machine to a conveyor;

Fig. 8 is a sectional view along the line 8—8 through the vessel engaging means shown in Fig. 7; and Fig. 9 is a perspective view of another form of vessel engaging and holding device.

Figure 2A:
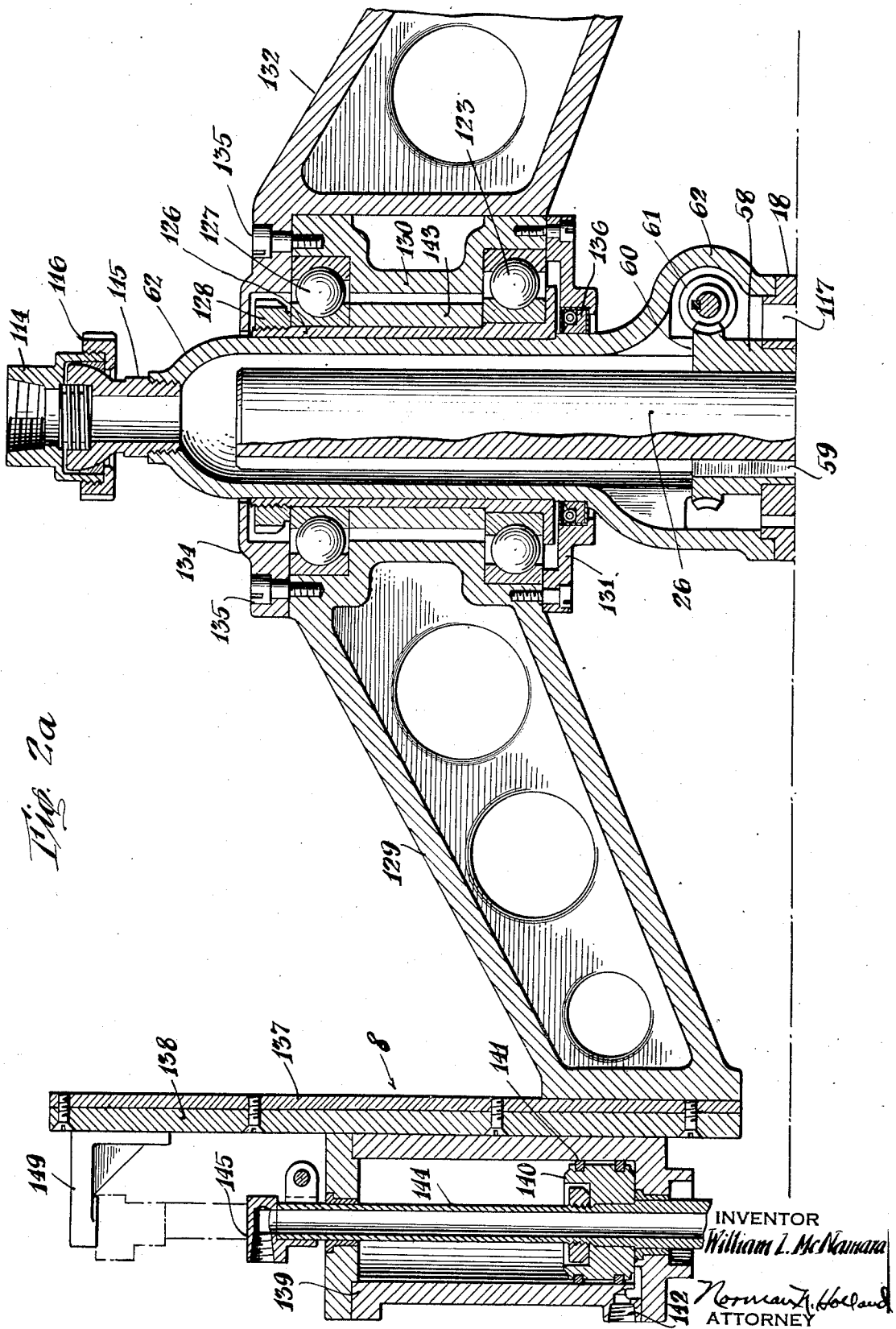

Described generally and referring particularly to Fig. 1, there is shown a conveyor 1 on which containers 2 are delivered to a preferred embodiment of the present transfer device 4 which engages the containers by means of the article engaging devices 5 and which transfers them in a substantially horizontal plane to any suitable support or machine 6. The machine 6 is not shown in detail, but it may be any type of machine or conveyor, for example, a rotating table with a series of holders for presenting the articles to finishing devices. Other devices are provided for inverting the article holders 5 and also for bending the supporting arms therefor in order to facilitate varying the speed of movement of the article holders so that their movement corresponds to the movement of the support or machine from which the containers are removed or to which they are delivered. In certain instances the conveyor 1 or the holders of the machine 6 may be at different levels, in which case a device 8, shown more particularly in Fig. 2a, may be utilized to raise the article from a mold, in which it may be to permit its engagement by the holders 5, or the device 8 may be utilized to lower the articles from the holders 5 to a conveyor. A suitable drive, shown more particularly in Fig. 2c, rotates the arms or holders 5 either continuously or intermittently The several parts of the machine referred to in the above general description will now be described in detail. The supporting structure for the transferring device is shown more particularly in Figs. 2a, 2b and 2c and may comprise a base casting 14 having suitable lugs 15 which may be bolted to a floor or other supporting foundation. A vertical column 16 is bolted to the upper open end of the casting 14 and extends upwardly in the form of an externally threaded cylinder 17 which supports the entire upper part of the machine. A casting 19 has an upper supporting table 22 and a hollow cylindrical part extending downwardly therefrom and telescoped about the externally threaded cylinder 17, as shown in Figs. 2b and 2c, and is secured to the threaded supporting cylinder 17 through the intermediation of a hand wheel 20 threaded to the supporting cylinder 17. By rotation of the hand wheel 20, the cylindrical part of the outer casting 19 and the entire upper part of the machine is raised or lowered as desired. The outer casting 19 is keyed at 21 to the inner cylinder 17 to prevent relative rotation therebetween. Bearings 24 and 25 are mounted internally of the cylinder 17 at the upper and lower ends thereof, respectively. These bearings support a rotatable shaft 26 which is mounted at its lower end in the ball bearing support 27 in the base of the casting 14. The parts of the machine to be rotated are operatively connected to this vertical shaft.

Figure 5:
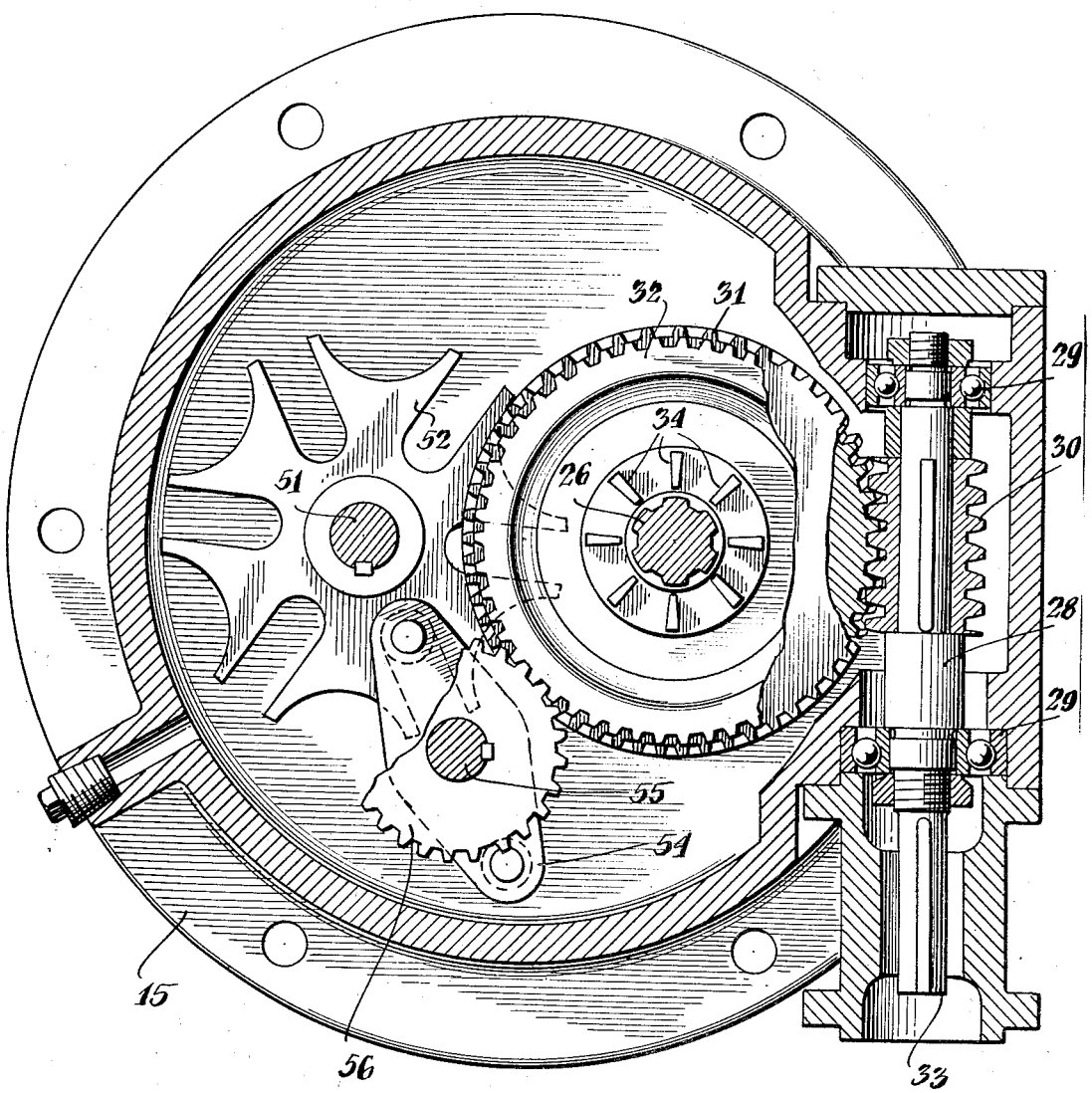
Fig. 5 is a sectional view along the line 5—5 of Fig. 2c.

The main drive for the transfer machine is shown in Figs. 2c, 4 and 5 and may comprise a driven shaft 28 which is mounted in ball bearings 29 and which has a worm gear 30 thereon meshing with gear 31. The shaft 28 is preferably connected at its end 33 with one of the main machines so that it will be synchronized therewith. The gear 32 has clutch engaging jaws 34 on its upper central portion. For the purpose of connecting the gear 31 to drive the shaft 26 there is mounted on the shaft 26 a sleeve 35 free to slide up and down on the shaft but prevented from rotation with respect thereto by members or ridges thereon which fit into grooves 36 in the shaft. When the sleeve 35 is moved downwardly until the clutch jaws 37 engage the clutch jaws 34, the shaft 26 is continuously driven by the worm 30 on drive shaft 28. For convenience in raising and lowering the sleeve 35 which acts as a clutch, there is provided a handle 38 (Fig. 4) which has a resiliently retained pin 39 fitting into a socket 40 to hold it in desired position. By pulling outwardly the end of the handle 38, the pin 39 may be removed from its socket 40 so that the handle may be raised or lowered to operate the clutch sleeve 35. This operation is obtained by reason of the fact that the handle or crank 38 is keyed to a shaft 41 mounted in suitable bearings and having arms 42 with the bifurcated end thereof in engagement with the pins 44 mounted on the sleeve 35.

The drive mechanism is also adapted to drive shaft 26 intermittently, that is to say, with stop and start movement. To accomplish this, the clutch handle 38 is moved upwardly into the position shown in Fig. 2c of the drawings where a gear 46 on the clutch sleeve 35 meshes with a gear 47 on shaft 48 as shown in Figs. 2c and 4. Shaft 48 has a second gear 49 thereon mounted below the gear 47 and meshing with a gear 50 keyed to shaft 51. Below the gear 50 on shaft 51 is one part of a Geneva drive (Figs. 2c and 5) which meshes with a Geneva drive member 54 keyed to shaft 55. Gear 56 also keyed to shaft 55 meshes with gear 32 bolted to gear 31 which is driven by the worm gear 30 on drive shaft 28. As the Geneva drive 54 rotates, the Geneva member 52 is rotated one-sixth of a revolution. Depending on the size of the gears, this may drive the vertical shaft 26 any desired part of a revolution through gear 50, gear 49, shaft 48, gear 47 and gear 46 on clutch sleeve 35 (Fig. 4). At the completion of the partial revolution, the shaft 26 will be stopped for a predetermined period. Thus it will be seen that the clutch may be utilized to change an intermittent operation to a continuous operation and vice versa.

The turret 18 and its associated parts, shown more particularly in Figs. 2b and 3, will now be described. The supporting table 22 at the upper end of the telescoping cylindrical casting 19 has a ball bearing 57 for rotatably supporting the turret 18, which is connected to the vertical shaft 26 by means of a cylindrical sleeve 58 (Figs. 2a and 2b) keyed thereto at 59 and having a gear 60 (Fig. 2a) on its upper end meshing with a worm 61. The worm 61 is rigidly connected to the casting 62 which is a part of the turret and hence directly connects the turret to the rotating vertical shaft 26 for the rotation thereof. The worm 61 permits the turret to be adjusted with respect to the shaft 26 so that the engagement of the holders with the articles to be transferred may be accurately timed. The turret 18 carries a series of arms 64 here shown as four in number although any desired number may be utilized. The arms have article engaging devices or holders 5 bolted or otherwise secured to their outer ends which in the preferred embodiment are operated by suction to hold the containers or other articles in place thereon. Likewise, the arms 64 are adapted to be bent as shown in Fig. 1, and also to be rotated to invert the holders 5 when desired. The several parts for performing these operations will now be described. A hollow shaft or member 65 extends outwardly from the turret 18 and connects at its inner end with a conduit 66 leading to a control valve 67 which connects with vacuum to subject the article holder 5 to a vacuum to engage and hold an article and then to atmosphere to break the vacuum and release the article. Each shaft 65 is mounted at its inner end in a bearing 53 and at its outer end in a bearing 68 retained in a housing 63 so that it may rotate about its longitudinal axis. A hinge construction 69 is bolted to the end of the hollow shaft or member 65. The hinge connection comprises a part 70 fixed to the hollow shaft 65 by bolts 71 and having a conduit 72 passing therethrough. The hinge part 70 has a roller bearing 74 bolted to its upper portion and has a recess 75 in its lower portion for receiving a roller bearing 76. A cooperating hinge part or holder 79 has a recess 77 at its upper portion for receiving the roller bearing 74 and has a similar roller bearing 76 bolted to its lower end. The hinge parts 70 and 79 are pivotally connected by the roller bearings 74 and 76, the part 70 being fixed to the turret and the part 79 being hinged thereto. The part 79 has a conduit 80 which connects with the conduit of the hollow arm 64 and which extends over and meets with the vertical portion of the conduit 72 of the part 70. A washer or other means 81 forms a substantially air-tight connection surrounding the conduits in the two hinge parts. Thus the part 79 may be rotated about the bearings 74 without impairing the vacuum connection to the holders 5. The hollow arm 64, having a suitable holder 5 at its outer end, is secured to the pivoted hinge part 79 by bolts 82. The holder 5 may be of any desired form, but as shown in Fig. 1, it is substantially U-shaped at its outer end with vacuum apertures, preferably six or eight in number, at the upper and lower parts of the U. When the holder 5 engages a container 2 moving on conveyor 1, the container will be forced against the bottom of the U, which is substantially the same shape as the container, by an asbestos rope 84 or similar member which may be stretched diagonally across the conveyor and secured at its ends to supports 85 and the vacuum effective through apertures in the holder 5 will retain the container 2 thereon.

For the purpose of swinging an arm 64 and its holder 5 about the hinge connection described above, there is provided a stub shaft 86 secured to a member 87 bolted to a part 83 of the turret 18. A crank 88 is rotatably mounted on the stub shaft 86 and has cam rollers 89 secured to the free end thereof. A second crank 90 is telescoped over the end of the first crank 88 on stub shaft 86 and has a bearing 91 at its free end supporting a pin 92. The pin 92 fits into a recess of a U-shaped yoke member 156 and the yoke member in turn fits into an annular groove 94 in the pivoted hinge part 79. The two cranks 88 and 90 on the stub shaft 86 are interconnected by means of interlocking projections 95 adjustably positioned with respect to each other by means of a set screw 96. The cam rollers 89 engage a cam 97 mounted on a supporting member 93 secured to the cylindrical part of the casting 19. A collar 99 held in position by set screw 100 retains the member 93 against accidental downward movement while set screw 98 permits rotary adjustment of the cam for proper operation of the arms. The details of the cam 97 are shown more particularly in Fig. 6. It may be made in any desired manner, but as here shown there is a cam hub 101 comprising a central portion 113 which extends about the vertical casting 19 and carries spaced upper and lower flange portions 123 and 133 adapted to receive between them cam sections or parts 102 and 103 which make up the cam 97 illustrated in Fig. 2b. The shape of the cam formed by the cam sections 102 and 103 may be adjusted by means of bolts 104 which pass through slots 105 in the lower flange portion 133. Thus the arm 64 may be bent at any desired point and returned to straight position at any other point. The cam sections 102 and 103 may be readily assembled with the cam hub 101 without dismantling any other parts of the machine. Other cam sections having different profiles than those illustrated may also be easily substituted in desired instances. It will be understood of course that any other desired manner of making the cam or providing for adjustment may be utilized to give the proper movement to the cam rollers 89 and arm 64.

For the purpose of rotating the holders 5 to invert them and the articles held thereby during movement from one position to another, there is provided a gear 106 on a sleeve 107 fixed to the hollow shaft 65. The gear 106 meshes with a sectional rack 108 bolted to the supporting table 22 of the casting 19 by bolts 109. Thus the rack 108 may be located to rotate the shaft 65, the arm 64, and holder 5 during the period after the article is engaged and before it is released. The holder may be returned to its upright position by a second similar gear rack after an article is released and before a second article is engaged. A smooth track 93 intermediate the rack sections 108 is preferably utilized to guide a flat portion on the sleeve 107 to prevent accidental rotation of the arms at points other than the gear racks. The groove 94 in the pivoted hinge member 79 permits the hinge and its associated parts to be rotated by reason of the fact that the groove is annular. Further the yoke 156 and pin 92 prevent the arm 64 from swinging about its hinge under the influence of the weight of the holder 5 and arm 64 while it is being rotated. In other words, the groove 94, yoke 156 and pin 92 prevent the arm 64 from dropping while being turned over. The cam roller 89 which operates the hinge arm is held against cam 97 by means of spring 111 attached at one end to a pin 110 extending from the support for the cam rollers and attached at its other end to a pin 112 attached to the part 87 of the turret (Figs. 2b and 6). The crank 90 which carries the arm-operating pin 92 is preferably held against an adjusting set screw on the arm 88 by means of a spring 158 (Fig. 6).

Referring more particularly to Figs. 2a, 2b and 3, there is a suction connection 114 rotatably secured to a member 115 threaded into the upper end of the machine and having attached thereto the vacuum connection 114 by means of the nut 116. A suitable vacuum or suction pump (not shown) may be attached to the connection in any suitable manner. The vacuum conduit extends down vertically through the casting 62, which may be bolted or otherwise suitably secured to the vertical casting 18, and about the vertical shaft 26 through conduit 117 (Fig. 2b) to the valves 118. Each of the valves 118 has a member 119 rotatable about a vertical axis with a star wheel 120 operatively connected to the lower end thereof. The star wheel, as it rotates about the machine on the turret 18, engages pins or rollers 121 bolted to the stationary table 22 of the machine, whereupon the pin rotates the star wheel, preferably a quarter of a turn. The pins 121 may be secured in slots so that their positions can be adjusted to change the time at which the vacuum is made effective and the time at which it is made ineffective and the conduit opened to atmosphere. The valves 118 may have four positions. In the position shown in Fig. 2b the conduit 117 leading from the vacuum pump is connected by chamber 122 to conduit 66 which leads to the hollow shaft 65, to conduits 72 and 80 in the hinge connection and thence to the hollow arm 64 leading to the suction holders 5. When the star wheel 120 engages a second roller, it is rotated from the position shown in Fig. 2b. The chamber 122 of the valve is then removed from alignment with the conduits 66 and 117. Thus, the conduit 117 is closed by the rotation of the valve and the conduit 66 is open to atmosphere through the valve port 124. When the valve is rotated a third time, the chamber 125 corresponding to 122 connects the conduits 66 and 117 and subjects the holders 5 to a vacuum. When rotated a fourth time, the conduit 117 and the conduit 66 is connected to atmosphere through the port 124. Thus the vacuum holders 5 are connected alternately to a source of suction and to atmosphere at predetermined points. It will be noted in the preferred embodiment shown in Fig. 3 that each valve is operatively connected to the holder immediately in front of it.

The machine thus far described may be used for transferring articles without the use of the parts about to be described, and is particularly useful where the machine, from which the ware or articles are removed, positions the ware so that it can be engaged and held by the vacuum arm. For example, many glass machines raise the ware out of the molds, in which case the ware is in a position where it can be readily engaged by the holders 5 and can be transferred to a suitable support by them. In certain cases, however, the ware or article may be within a holder so that it has to be raised to be removed from the holder. In other instances it is necessary to lower the ware to a support or conveyor or into a holder after it has been transferred. In such instances it is desirable that the transfer device be capable of functioning properly with such machinery.

The present invention provides a mechanism, shown more particularly in Fig. 2a, which will raise the articles out of a mold or other holder and position them so that they may be engaged by the holders 5. The mechanism will also engage the articles and lower them to a support or machine at the delivery station. In the preferred embodiment of the mechanism shown in Fig. 2a a sleeve 126 is mounted over the upper end 62 of the column and is flanged at its lower end to support a ball bearing 123, a ball bearing 127 spaced from the lower ball bearing by a sleeve 143 and held in position by a nut 128 threaded to the upper end of the sleeve 126. A supporting arm 129 has an integral collar 130 which fits about the ball bearings 123 and 127 and also about the upper end of the collar. A suitable collar 131 is bolted about the lower part of the collar 130 to extend under the ball bearings and the sleeve 126 and carries an appropriate sealing means 136 adapted to prevent lubricant for the ball bearings from escaping and running down the casing 62. A second supporting arm 132, having an integral collar 134 at its upper end, is adapted to fit over the upper end of the column and to be secured to the collar 130 of supporting arm 129 by means of bolts 135. The collar 130 may have sufficient apertures therein so that the relative position of the arms 129 and 132 may be adjusted with respect to each other. The purposes of these arms are to support lifting and lowering devices.

As shown in Fig. 2a a bracket 137 may extend upwardly from the end of the arm 129 and have bolted thereto a plate 138 to which is secured an air cylinder 139. The air cylinder preferably has a piston 140 therein with suitable piston rings 141 to secure a tight fit. A threaded aperture 142 is provided at the lower end of the cylinder for the attachment of an air pressure supply which provides air for raising the piston. A similar attachment may be provided at the upper end for lowering the piston, but generally gravity is sufficient for this purpose. The piston rod 144 is preferably hollow with an attachment at its upper end 145 for a vacuum connection. At the lower end of the piston rod 144 (Fig. 2b) a vacuum holder 146 is mounted having vacuum apertures 147. The holder 146 may be of any suitable material but as here shown the vessel engaging parts are preferably made of cast iron or aluminum. The ball member 148 threaded to the end of the piston rod forms in effect a ball and socket joint which permits the holder 146 to adjust itself to fit flat on the ware to be engaged. The upward movement of the piston may be limited by a bracket 149 mounted at the upper end of plate 138. The lower movement of the piston is limited by the engagement of the holder 146 with the article to be raised. Thus the holder 146 may be lowered to engage an article, which will be held thereon by vacuum supplied through the connection 145, and may be raised by pressure admitted at the lower end of the cylinder to align the article in the same horizontal plane with the holders 5 so that the holders in their rotary movement will pick up the article and transfer it. The vacuum to the raising means may be relieved at the time the holders 5 engage the articles.

The arm 132 may have a lowering device which corresponds to the lifting device on the arm 129. Since the same type of cylinder and operating mechanism may be used either for raising or lowering articles, a detailed description of the device on the arm 132 is not necessary, as the pressure can be timed to lower an article as well as to raise it. In operating the lowering and raising mechanisms with the holders 5, the hinge structures may be operated to change the speed of movement of the holders at the time they engage articles on the vertical lift to obtain optimum results. The ball bearings 123 and 127 are for the purpose of permitting the upper end of the column to rotate without affecting the position of the arms 129 and 132 which may be secured to stationary supports.

Referring more particularly to Figs. 7 and 8, a modified form of hinge construction and a different type of vacuum holder are shown for transferring articles such as ashtrays and the like. The hinge 154 is shown offset to one side of the transfer arm instead of at its mid-portion and an adjustable set screw 155 is provided adjacent the side of the transfer arm opposite to the hinge. An arm may be swung rearwardly after depositing an article and, upon being moved back into operative position, a portion thereof comes into contact with the head of set screw 155. The set screw 155 may be screwed in or out of its seat to provide accurate adjustment of an article holder with respect to an article which is to be picked up and transferred. The offset hinge and set screw features may, of course, be utilized with the embodiment shown in Fig. 1 of the drawings. The holder 5' illustrated in Fig. 7 is preferably L-shaped with vaccum apertures 150 adapted to engage the sides of the tray 2'. As viewed in section in Fig. 8 the portion of the L engaging the ashtray is shaped substantially to fit the underedge of the ashtray 2'. Thus when the arm engages the ashtray, the latter will be held firmly in position by means of the suction apertures 150. It will be noted that in changing from one type of article to another, it is merely necessary to change the holder which is applied to the turret 18. This can be removed and replaced very rapidly by means of the bolts 82 (Fig. 2b). The device in Fig. 7 is shown removing an article from a glass machine 6' and placing it on a conveyor. The suction becomes effective upon engagement with the article on the glass machine and becomes ineffective upon delivery of the articles to the conveyor. The holder 5' is substantially at the level of the conveyor and usually moves faster than the conveyor. Hence just after depositing the article on the conveyor, the arm is generally moved backward about the arm hinge as shown in dotted lines so that it will swing clear of the article without changing the speed of either the turret or the conveyor.

A further type of holder is shown in Fig. 9 which is primarily adapted for large jars, such as a fish bowl and the like. The holder may be bolted to the usual arms on the turret by means of the bolts 82 (Fig. 2b) extending through slots 151 in the upper extending part 152 of the holder 5″. The shape of the holder is substantially circular so that it will fit under the bowl or other article and hold it in position. Such a holder can be used with suction apertures but it is found that such apertures are not required in all cases and the present modification is to illustrate the application of the invention to holders without suction devices. In the use of the modified device, the source of suction is merely shut off and the machine operated in the same manner as with suction devices.

In the operation of the machine, the transfer mechanism 4 is positioned adjacent a machine from which ware is to be removed or onto which ware is to be placed. A conveyor either delivers articles to the transfer device or takes them away from it. As shown in Fig. 1, the transferring device is mounted intermediate the two machines, or intermediate the conveyor and the machine with which it cooperates. The transfer device is preferably connected to one of the machines with which it is working so that it will move synchronously therewith. This may be accomplished by a connection to shaft 26 (Figs. 4 and 5). Thereafter the clutch 38 is operated so that the transfer machine moves either continuously or intermittently depending upon the types of the machine with which it is operating. The height of the transfer mechanism, that is the transfer arms, may be raised or lowered by turning the hand wheel 20 (Fig. 2c) about the casting 17 which raises and lowers the casting 19 telescoped thereabout and the table 22 integral with the upper end thereof. Such adjustment in height may require a corresponding adjustment with respect to the cam 97 for operating the swinging arms. The latter may be accomplished by the adjustment of the collar 99 and the support 93 for the cam by means of bolts 100 and 98, respectively.

Thereafter the cam 97 is adjusted so that the arms 64 swing at the right point and at the right speed to cause the holders 5 to be moving at substantially the same speed as the articles at the time the articles are engaged or disengaged. The operation of the drive for the transfer machine rotates shaft 26 which is operatively connected to the turret 18 by means of sleeve 58 keyed to the shaft 26 and in turn connected through a worm gear 61 to the outer casting of the column 62 which in turn is connected to the turret 18. Thus the entire column above the casting 19 rotates with the turret. As a holder 5 engages a container 2 on a conveyor (Fig. 1), the asbestos rope 84 directs the container against the holder to securely fix it within the holder. The vacuum valve 18 (Fig. 2b) is then operated by a pin 121 and a star wheel 120 to connect the vacuum conduits 117 and 66, whereby vacuum from the vacuum connection 114 at the top of the column is effective upon a holder 5 through the hollow column, conduit 117 leading to the valve 118, chamber 122 or 125 of the valve, conduit 66, hollow arm or sleeve 65, conduits 72 and 80 and the hollow arm 64. The vacuum becomes effective on the article and holds it in position on the holder. In some cases it may be desired to invert the article, for example, a tumbler is ordinarily delivered from a forming machine in upright position, but in passing through a leer there is more stability if placed therein in inverted position. Hence it may be desirable to invert the article during the transfer thereof. If so, a rack 108 is bolted in position to engage gear 106 (Fig. 2b) so that the gear 106 passes over the rack as the turret is rotated and the gear is turned to invert the holder. On its return movement the gear 106 may be turned again to bring the holder 5 into its upright position. If it is not necessary to invert the article, the rack 108 is removed. If the turret and the holder for the container being delivered is moving at a speed differing from that of the holders on the turret, it may be desirable to bring the two to the same speed during the engagement or delivery of the articles. This may be done by adjusting the cam 97 which operates the roller 89 which in turn operates the pin 92 and yoke 156 to move the arm 65 about the hinge joint 74 without disturbing the vacuum connection. Thus the speed of the holders 5 may be changed without stopping or changing the speed of the turret 18. In this manner jars or other articles may be placed on a machine or a holder which is moving at a speed differing from the speed of the turret. Likewise the arms may be bent backwardly as shown in Fig. 7 to swing clear of an article which has been placed on a stationary support or slow moving conveyor without requiring the turret to be stopped. When the arm reaches the support where the article is to be delivered, a pin 121 rotates the star wheel 120 of a valve 119 ninety degrees whereupon the conduit 66 is connected to the atmosphere port 124 of the valve which breaks the vacuum.

With certain machines it is desirable or necessary that the transfer device raise or lower the articles being transferred at the time of their engagement or delivery. The devices shown in Figs. 2a and 2b comprise a lifting mechanism for raising or lowering the articles. In the operation of the lifting devices, air is removed from the lower end of the cylinder 139 to permit the piston rod 144 to drop by gravity until its lower vacuum head 147 engages the article to be raised; whereupon vacuum becomes effective to hold the article. Then air under pressure is applied to the lower end of the cylinder at the inlet 142 to raise the piston 140 and the piston rod 144 to a desired position determined by the position of the bracket 148 which engages the upper end of the piston rod whereupon the container is in position to be picked up by horizontally moving holders 5′. The vacuum in the suction head is then released and the article is left on the holder 5′ to be transferred to a suitable machine or conveyor.

A similar mechanism may be used for lowering the articles at their delivery point. Such a device may be mounted on the arm 132. The supporting arms 132 and 129 for the lifting mechanisms are mounted on the upper end of the rotating column. Since it is desired that the arms be stationary they are mounted on roller bearings 123 and 127 to avoid any interference with the rotation of the column. The upper vacuum connection 114 is likewise rotatably mounted on the upper end of the column to avoid interference with the rotation thereof.

It will be seen that the present invention provides a transfer mechanism which has many advantages over present types. The mechanism may be applied to machines which operate at different rates of speed and, at the same time, may be synchronized with both machines to engage and remove articles from one and to place them on the other. Where the machines form the articles and leave them in molds, the transfer mechanism is adapted automatically to lift the articles from the molds so that they clear the molds and are engaged by the transfer arms. Likewise where intermittent or continuous movement of the transfer mechanism is desired, it can be had merely by the operation of a clutch provided therefor. The machine has a wide range of uses not possessed by other machines. At the same time it is simple in construction and inexpensive to operate. Since sources of pressure and vacuum are readily available in most glass factories for which the present machine is particularly designed, the machine does not require auxiliary mechanisms not readily available.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a transferring device of the class described, the combination of a turret, a holder pivotally mounted on said turret, a vacuum conduit extending through said holder, and through the pivot therefor a hollow transfer arm having a suction operated vessel supporting device thereon, said vacuum conduit and said hollow arm forming a suction connection for said suction device, a cam, means engaging said cam and operatively connected to said holder, to swing said holder during the rotation of said turret responsively to the shape of said cam without impairing the suction connection.

2. In a transferring device of the class described, the combination of a turret, a transfer arm mounted on said turret having a suction operated vessel engaging means at the outer end thereof adapted to engage a vessel moving on a conveyor, a conveyor for moving the vessel, and resilient means extending diagonally across the conveyor to force the vessels moving on the conveyor against said suction head.

3. In a transferring device of the class described, the combination of a turret, a conveyor adjacent said turret, a suction operated article engaging means mounted on said turret, said suction engaging means being substantially U-shaped, means for rotating said turret and the engaging means thereon to bring said suction holder into engagement with an article moving on said conveyor, and a flexible cord extending diagonally across the conveyor to force said article firmly into the holder.

4. In a transferring device of the class described, the combination of a turret, a conveyor adjacent said turret, a suction operated article engaging means pivotally mounted on said turret, said suction engaging means being substantially U-shaped, means for rotating said turret and the engaging means thereon to bring said suction holder into engagement with an article moving on said conveyor, means to swing said engaging means about its pivot to change the speed of movement of said engaging means without varying the speed of movement of the turret, and a flexible cord extending diagonally across the conveyor to force said article firmly into the holder.

5. In a unitary transferring device, a frame, an article engaging suction head supported by said frame adapted to engage the upper end of an article and raise it, a plurality of article engaging means supported by said frame and adapted to remove the articles suspended successively from said suction head and to transfer the articles in a substantially horizontal plane to a machine or conveyor.

6. In a unitary transferring device, the combination of a supporting column, an article engaging means supported by said column and adapted to engage the upper end of the article and raise the article from the mold of a glass machine, a second article engaging means supported by said column and adapted to engage and remove the article from said first engaging means and transfer it in a substantially horizontal direction, and a third article engaging means similar to said first article engaging means supported by said column and adapted to engage the upper end of the article and remove the article from said second engaging means and to lower said article vertically to a conveyor or support.

7. In a transferring device of the class described, the combination of a turret, an article transfer arm mounted on the turret to transfer glassware from one position to another, continuously operated driving means for said turret, a Geneva drive operatively connected to said continuously operated driving means and devices for operatively connecting said turret directly to said continuous drive and for connecting said turret thereto through said Geneva drive.

8. In a transferring device of the class described, the combination of a turret, an article transferring arm mounted on said turret, a shaft for rotating said turret to swing said transferring arm into engagement with articles to be transferred, a Geneva drive, and means for operatively connecting either said Geneva drive or said continuous drive to said shaft, said means being ineffective to connect both drives to said shaft simultaneously.

9. In a transferring device of the class described, the combination of an operating means having a hollow member adapted to rotate about a center and extending outwardly therefrom, means for subjecting said hollow member to a partial vacuum, a hollow arm having a suction device at one end thereof for engaging an article, and means for pivotally connecting the other end of said arm to said hollow member, said pivoting means forming a substantially airtight connection between the conduits of said hollow arm and said hollow member to permit the arm to swing about the axis of the pivot without disturbing the vacuum connection to the means for subjecting the hollow arm to a partial vacuum, the axis of the pivot being substantially perpendicular to the axis of the hollow arm.

10. In a transferring device of the class described, the combination of an operating means having a hollow member rotating about a center and extending outwardly therefrom, means for subjecting said hollow member to a partial vacuum, a hollow arm having a suction device at one end thereof for engaging an article, means for pivotally connecting the other end of said arm to said hollow member, said pivoting means forming a substantially airtight connection between the conduits of said hollow arm and said hollow member to permit the arm to swing about the axis of the pivot without disturbing the vacuum connection to the means for creating a partial vacuum, the axis of the pivot being substantially perpendicular to the axis of the arm, and means for moving said arm about said pivot to change the speed of movement of said suction device without changing the rate of movement of said operating means.

11. In a transferring device of the class described, the combination of an operating means having a plurality of hollow members rotating about a center and extending outwardly therefrom, means for subjecting said hollow members to a partial vacuum, a plurality of hollow arms having suction devices at one end thereof for engaging articles, means for pivotally connecting the other ends of said hollow arms to said hollow members, said pivoting means forming substantially airtight connections between the conduits of said hollow arms and said hollow members to permit the arms to swing about the axes of the pivots without disturbing the vacuum connections to the means for creating a partial vacuum, the axes of the pivots being substantially perpendicular to the axes of the arms, and means for moving said arms about said pivots to change the speed of movement of said suction devices without changing the rate of movement of said operating means.

12. In a transferring device of the class described, the combination of a rotating turret, a hollow member on said rotating turret extending outwardly from the center thereof, means for subjecting said hollow member to suction, a hollow arm having a suction device at one end thereof for engaging and supporting an article and a pair of bearings having their axes extending transversely with respect to the axis of said member, one of said bearings being operatively connected to said arm and the other of said bearings being operatively connected to said hollow member to pivotally connect said hollow member to said arm and to form a substantially airtight connection therebetween.

13. In a transferring device of the class described, the combination of an operating means having a hollow member rotating about a center, means for subjecting said hollow member to suction, a hollow arm having a suction device at one end thereof for engaging an article, a pair of members secured to said hollow member and to said arm having conduits therein registering with the conduits in said hollow member and in said arm, said pair of members being rotatable with respect to each other about an axis substantially perpendicular to the axis of said arm.

14. In a transferring device of the class described, the combination of rotary operating means having a hollow member rotating with it and extending outwardly therefrom, means for subjecting said hollow member to suction, a hollow arm having a suction device at one end thereof for engaging and supporting an article, and a pair of members with bearings therein operatively connected to said hollow member and to said arm, said pair of members having conduits for registering respectively with the conduit of said hollow member and the conduit of said arm, the junction of said conduits in said pair of members having a sliding surface permitting said pair of members to rotate with respect to each other on said bearings and thereby hinge said arm and said hollow member together without impairing the suction conduit leading to said suction device.

15. In a transferring device of the class described, the combination of rotary operating means having a hollow member rotating with it and extending outwardly therefrom, means for subjecting said hollow member to suction, a hollow arm having a suction device at one end thereof for engaging an article, a pair of members with bearings therein operatively connected to said hollow member and to said arm, said pair of members having conduits which register respectively with the conduit of said hollow member and the conduit of said arm, the junction of said conduits in said pair of members having a sliding surface permitting said pair of members to rotate with respect to each other and thereby hinge said arm and said hollow member together without impairing the suction conduit leading to said suction device, said pair of members having an annular guideway, a yoke adapted to engage in said annular guideway, and means for turning said yoke to swing said arm with respect to said hollow member.

16. In a transferring device of the class described, the combination of a rotary mechanism having a hollow member, bearings for supporting said hollow member and permitting it to rotate about its longitudinal axis, a hollow arm having a suction device at one end thereof adapted to engage and support a glass vessel, means including a pair of bearings having an axis extending transversely with respect to the axis of said arm for pivotally connecting said member and said arm and operatively connecting the conduits therein, means for rotating said member about its longitudinal axis, and means for swinging said arm about the axis of said bearings, said rotating means and swinging means being operative consecutively.

17. In a transferring device of the class described, the combination of operating means having a hollow member, a hollow arm pivotally and hermetically connected to said hollow member and having a suction holder at one end thereof, the axis of the pivot being substantially perpendicular to the axis of the arm, means for subjecting said suction holder to a vacuum through the intermediation of said hollow member and hollow arm, and means for moving said arm about the axis of said pivot to change the speed of movement of said suction holder without changing the speed of movement of said operating means and without impairing the suction connection.

18. In a transferring device, the combination in a unitary structure of a frame, an arm connected to said frame and extending laterally therefrom, an air cylinder supported by said arm having a piston and piston rod associated therewith, a suction head on said piston rod for engaging the upper end of a glass vessel and for raising it out of the mold of a glass machine when said piston is raised, a plurality of vessel engaging means supported by said frame and adapted to engage and support successively the vessels suspended periodically in mid air from said suction head and to transfer the vessel in a substantially horizontal plane to a machine or a conveyer.

19. In a transferring device of the class described, the combination in a unitary structure of a vertical column, an arm extending laterally from said column, a pneumatic cylinder supported by said arm and a suction head for engaging and supporting a vessel operatively connected to be raised and lowered by said pneumatic cylinder thereby to raise a vessel out of the mold of a glass machine, a turret mounted to rotate in one direction about said column and a plurality of arms on said turret having means thereon for engaging the raised vessel suspended in mid air by said raising means and transferring the vessel laterally to a support.

20. In a transferring device of the class described, the combination of a supporting column, a pair of arms pivotally mounted on said column to be adjusted in position thereabout, a pneumatic cylinder on each of said arms, vessel engaging and supporting means adapted to engage the upper end of a vessel and operatively connected to be raised and lowered by each of said cylinders, and transfer means for engaging a vessel raised and suspended by one of said vessel engaging means and delivering it to the other of said vessel engaging means to be engaged and lowered thereby.

21. A device in accordance with claim 20, in which the vessel engaging means have suction heads to support the vessels by suction.

22. In a transferring device of the class described, the combination of a turret, a shaft for rotating said turret, an article transfer device mounted on said turret to transfer glassware from one position to another, continuously operating drive means, a Geneva drive operatively connected to said drive means, and a sleeve keyed to said turret shaft and slidable thereon for connecting said turret shaft selectively to said continuously operating drive directly and to said continuously operating drive through said Geneva drive, thereby to drive said turret continuously or intermittently.

23. In a transferring device of the class described, the combination of a turret, a shaft for rotating said turret, an article transfer arm mounted on the turret to transfer glassware from one position to another, a continuously operating drive gear, a Geneva drive operatively connected to said drive gear, and a gear keyed to said turret shaft and slidable thereon adapted to move into operative relation selectively with said Geneva drive and with said continuously operating drive gear.

24. In a transferring device of the class described, a supporting base, a turret mounted on said base, a shaft for rotating said turret extending upwardly through said base, an article transfer device mounted on the turret having a plurality of arms for supporting and transferring glassware from one position to another, a continuously operating drive gear, a Geneva drive mounted in said base and operatively connected to said drive gear and devices in said base for operatively and selectively connecting said turret shaft to said continuous drive means through said Geneva drive and to said drive means directly.

WILLIAM L. McNAMARA.